US010653264B2

(12) United States Patent
Li et al.

(10) Patent No.: US 10,653,264 B2
(45) Date of Patent: May 19, 2020

(54) METHOD AND DEVICE FOR CONTROLLING HEATING TEMPERATURE OF ELECTRIC RICE COOKER, AND ELECTRIC RICE COOKER

(71) Applicant: GREE ELECTRIC APPLIANCES, INC. OF ZHUHAI, Guangdong (CN)

(72) Inventors: Wenbin Li, Guangdong (CN); Yuting Liu, Guangdong (CN); Zhixiong Yin, Guangdong (CN); Yuxin Hu, Guangdong (CN); Bofu Zhu, Guangdong (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 0 days.

(21) Appl. No.: 16/343,310

(22) PCT Filed: Oct. 16, 2017

(86) PCT No.: PCT/CN2017/106347
§ 371 (c)(1),
(2) Date: Apr. 18, 2019

(87) PCT Pub. No.: WO2018/072671
PCT Pub. Date: Apr. 26, 2018

(65) Prior Publication Data
US 2019/0298100 A1 Oct. 3, 2019

(30) Foreign Application Priority Data
Oct. 21, 2016 (CN) .......................... 2016 1 0917648

(51) Int. Cl.
*A47J 27/21* (2006.01)
*A47J 27/06* (2006.01)
(Continued)

(52) U.S. Cl.
CPC ............. *A47J 27/62* (2013.01); *A47J 27/004* (2013.01); *G05D 23/1931* (2013.01); *H05B 1/0261* (2013.01)

(58) Field of Classification Search
CPC ............. A47J 27/06; A47J 27/21–2105; A47J 27/21058; A47J 27/21158; A47J 31/54
See application file for complete search history.

(56) References Cited

U.S. PATENT DOCUMENTS 4,544,830 A * 10/1985 Miller ............... A47J 27/21058
219/437
5,830,520 A * 11/1998 You ........................... A23L 5/13
426/233
(Continued)

FOREIGN PATENT DOCUMENTS

CN 101766439 A * 7/2010 .............. A47J 27/00
CN 101766439 A 7/2010
(Continued)

OTHER PUBLICATIONS

International Search Report for International Application No. PCT/CN2017/106347, dated Jan. 12, 2018, 2 pages.

*Primary Examiner* — Michael A Laflame, Jr.
(74) *Attorney, Agent, or Firm* — Armstrong Teasdale LLP

(57) ABSTRACT

A method and a device for controlling a heating temperature of an electric rice cooker and the electric rice cooker. The control method comprises: when determining that the electric rice cooker is in a boiling state, according to a temperature of a bottom temperature sensing bulb and a temperature of a top temperature sensing bulb, judging whether a bottom temperature of the electric rice cooker rises too fast (S110), when determining that the bottom temperature rises too fast, controlling a heating plate to temporally stop heating the bottom of the electric rice cooker (S120); and after the temperature of the bottom temperature sensing bulb falls to (Continued)

a first preset temperature, controlling the heating plate to reheat the bottom at a heating power in the boiling stage (S130).

15 Claims, 7 Drawing Sheets

(51) Int. Cl.
    *A47J 27/62*       (2006.01)
    *A47J 27/00*       (2006.01)
    *H05B 1/02*        (2006.01)
    *G05D 23/19*       (2006.01)

(56) References Cited

U.S. PATENT DOCUMENTS

| | | | |
|---|---|---|---|
| 6,433,693 B1* | 8/2002 | Mathews, Jr. | A47J 27/21058 219/494 |
| 2004/0149729 A1* | 8/2004 | Kressmann | A47J 27/21083 219/494 |
| 2005/0247696 A1* | 11/2005 | Clothier | H05B 3/746 219/497 |
| 2007/0000906 A1* | 1/2007 | Kaastra | A47J 27/21 219/441 |
| 2007/0151457 A1* | 7/2007 | Rabin | A47J 27/21008 99/275 |
| 2008/0041231 A1* | 2/2008 | Beharry | A47J 31/54 99/279 |
| 2011/0259871 A1* | 10/2011 | Li | A47J 27/21158 219/441 |
| 2013/0220137 A1* | 8/2013 | Bombeck | A47J 31/46 99/287 |
| 2016/0037955 A1* | 2/2016 | Kim | A47J 27/57 99/344 |

FOREIGN PATENT DOCUMENTS

| | | | | |
|---|---|---|---|---|
| CN | 202161198 U | 3/2012 | | |
| CN | 104257268 A | 1/2015 | | |
| CN | 105266566 A2 | 1/2016 | | |
| CN | 105411368 A | 3/2016 | | |
| CN | 105455663 A | 4/2016 | | |
| CN | 106388556 A | 2/2017 | | |
| JP | H05253049 A | * 10/1993 | | A47J 27/00 |
| JP | 2995982 B2 | 10/1999 | | |
| JP | 2000279322 A | * 10/2000 | | A47J 27/00 |
| JP | 2004065328 A | * 3/2004 | | A47J 27/00 |
| JP | 2008307328 A | 12/2008 | | |
| JP | 2012239630 A | 12/2012 | | |
| JP | 2014144145 A | 8/2014 | | |
| JP | 2015033652 A | 2/2015 | | |
| JP | 2016112182 A | 6/2016 | | |
| JP | 2016129612 A | 7/2016 | | |
| KR | 100765338 B1 | 10/2007 | | |

\* cited by examiner

METHOD AND DEVICE FOR CONTROLLING HEATING TEMPERATURE OF ELECTRIC RICE COOKER, AND ELECTRIC RICE COOKER

CROSS-REFERENCE TO RELATED APPLICATIONS

The present disclosure is the national stage entry of International Patent Application No. PCT/CN2017/106347, filed on Oct. 16, 2017, which is based upon and claims the benefit of priority to Chinese Patent Application No. 201610917648.4, filed on Oct. 21, 2016, the contents of which are hereby incorporated by reference in their entirety.

TECHNICAL FIELD

The present invention relates to the technical field of automatic control, and in particular to a method and a device for controlling a heating temperature of an electric rice cooker, and the electric rice cooker.

BACKGROUND

A rice cooking process of an electric rice cooker generally comprises four stages: a rice soaking stage, a heating stage, a boiling stage and a rice stewing stage. Different heating powers are adopted by different stages.

A bottom temperature sensing bulb is disposed at a bottom of a main body of the electric rice cooker and can sense a bottom temperature in real time. A controller may judge which stage of the electric rice cooker is in at present by acquiring a temperature of the bottom temperature sensing bulb. For example, for some electric rice cooker, when temperature of the bottom temperature sensing bulb<60° C., the electric rice cooker is in the rice soaking stage; when 60° C.≤temperature of the bottom temperature sensing bulb≤80° C., the electric rice cooker is in the heating stage; when 80° C. <temperature of the bottom temperature sensing bulb≤120° C., the electric rice cooker is in the boiling stage; and when temperature of the bottom temperature sensing bulb>120° C., the electric rice cooker is in the rice stewing stage.

SUMMARY

It is recognized by the inventor that some users generally like cooking rice with hot water in actual use. Under such a case, a temperature of a bottom temperature sensing bulb rises fast, so that under a condition in which the rice is not fully boiled, the temperature of the bottom temperature sensing bulb exceeds a temperature corresponding to a rice stewing stage, and thus a rice cooking process enters the rice stewing stage early, and the rice is not cooked thoroughly and is half-cooked.

In order to solve the above problems, the following technical solutions are provided by the embodiments of the present invention.

According to one aspect of some embodiments of the present invention, there is provided a method for controlling a heating temperature of an electric rice cooker, which may comprise: when determining that the electric rice cooker is in a boiling state, according to a temperature of a bottom temperature sensing bulb and a temperature of a top temperature sensing bulb, whether a bottom temperature of the electric rice cooker rises too fast is judged, where the bottom temperature sensing bulb is configured to collect the bottom temperature, and the top temperature sensing bulb is configured to collect a temperature at a pot cover; when determining that the bottom temperature rises too fast, a heating plate is controlled to temporally stop heating a bottom of the electric rice cooker; and after the temperature of the bottom temperature sensing bulb falls to a first preset temperature, the heating plate is controlled to reheat the bottom at a heating power in the boiling stage.

Optionally, the determining that the electric rice cooker is in a boiling stage may comprise: acquiring the temperature of the bottom temperature sensing bulb; and according to the temperature of the bottom temperature sensing bulb, judging whether the electric rice cooker is in the boiling stage.

Optionally, the determining that the electric rice cooker is in a boiling stage may comprise: acquiring the temperature of the bottom temperature sensing bulb; respectively comparing the temperature of the bottom temperature sensing bulb with a second preset temperature and a third preset temperature; and under a condition in which the temperature of the bottom temperature sensing bulb is higher than the second preset temperature, and is lower than or equal to the third preset temperature, determining that the electric rice cooker is in the boiling stage, where the third preset temperature is higher than the second preset temperature, and the first preset temperature is higher than the second preset temperature, and is lower than the third preset temperature.

Optionally, after it is determined that the electric rice cooker is in the boiling stage according to the temperature of the bottom temperature sensing bulb, acquiring the temperature of the bottom temperature sensing bulb and the temperature of the top temperature sensing bulb.

Optionally, under a condition in which the temperature of the bottom temperature sensing bulb is higher than or equal to a fourth preset temperature, and the temperature of the top temperature sensing bulb is lower than or equal to a fifth preset temperature, it is determined that the bottom temperature rises too fast, where the fifth preset temperature is lower than the fourth preset temperature, and the fourth preset temperature is higher than the second preset temperature, and is lower than the third preset temperature.

Optionally, under a condition in which the temperature of the bottom temperature sensing bulb is lower than the fourth preset temperature, or the temperature of the top temperature sensing bulb is higher than the fifth preset temperature, it is determined that the bottom temperature does not to rise too fast.

Optionally, the temperature of the bottom temperature sensing bulb and the temperature of the top temperature sensing bulb are acquired at a preset cycle.

According to another aspect of some embodiments of the present invention, there is provided a device for controlling a heating temperature of an electric rice cooker, which may comprise: a first judgment module, configured to judge, when determining that the electric rice cooker is in a boiling state, according to a temperature of a bottom temperature sensing bulb and a temperature of a top temperature sensing bulb, whether a bottom temperature of the electric rice cooker rises too fast, where the bottom temperature sensing bulb is configured to collect the bottom temperature, and the top temperature sensing bulb is configured to collect a temperature at a pot cover; and a control module, configured to control, when determining that the bottom temperature rises too fast, a heating plate to temporally stop heating the bottom of the electric rice cooker, and control, after the temperature of the bottom temperature sensing bulb falls to a first preset temperature, the heating plate to reheat the bottom at a heating power in the boiling stage.

Optionally, the device may further comprise: a first acquisition module, configured to acquire the temperature of the bottom temperature sensing bulb; and a second judgment module, configured to respectively compare the temperature of the bottom temperature sensing bulb with a second preset temperature and a third preset temperature, and determine, under a condition in which the temperature of the bottom temperature sensing bulb is higher than the second preset temperature, and is lower than or equal to the third preset temperature, that the electric rice cooker is in the boiling stage, where the third preset temperature is higher than the second preset temperature, and a first preset temperature is higher than the second preset temperature, and is lower than the third preset temperature.

Optionally, the device may further comprise: a second acquisition module, configured to acquire, after it is determined that the electric rice cooker is in the boiling stage, the temperature of the bottom temperature sensing bulb and the temperature of the top temperature sensing bulb; and the first judgment module may comprise: a comparison sub-module, configured to compare the bottom of the bottom temperature sensing bulb with a fourth preset temperature and compare the temperature of the top temperature sensing bulb with a fifth preset temperature, where the fifth preset temperature is lower than the fourth preset temperature, and the fourth preset temperature is higher than the second preset temperature, and is lower than the third preset temperature; and a first determination sub-module, configured to determine, under a condition in which the temperature of the bottom temperature sensing bulb is higher than or equal to the fourth preset temperature, and the temperature of the top temperature sensing bulb is lower than or equal to the fifth preset temperature, that the bottom temperature rises too fast.

Optionally, the first judgment module may further comprise: a second determination sub-module, configured to determine, under a condition in which the temperature of the bottom temperature sensing bulb is lower than the fourth preset temperature, or the temperature of the top temperature sensing bulb is higher than the fifth preset temperature, that the bottom temperature does not rise too fast.

According to another aspect of some embodiments of the present invention, there is provided a device for controlling a heating temperature of an electric rice cooker, which may comprise: a memory; and a processor coupled to the memory, where the processor is configured to execute the method in the above any embodiment based on an instruction stored in the memory.

According to a still another aspect of some embodiments of the present invention, there is provided a computer readable storage medium, which stores a computer program instruction; and the instruction implements the method in the above any embodiment when being executed by a processor.

According to a still another aspect of some embodiments of the present invention, there is provided an electric rice cooker, which may comprise: a heating plate, a bottom temperature sensing bulb, a top temperature sensing bulb and a controller; the heating plate is disposed in an electric rice cooker main body, and is configured to heat the liner of the electric rice cooker; the bottom temperature sensing bulb is disposed at a bottom of the electric rice cooker main body, and is configured to collect a bottom temperature of the liner; the top temperature sensing bulb is disposed on a pot cover of the electric rice cooker, and is configured to collect a temperature at the pot cover; a first input end of the controller is electrically connected with the bottom temperature sensing bulb; a second input end of the controller is electrically connected with the top temperature sensing bulb; an output end of the controller is electrically connected with the heating plate; and the controller is configured to judge, when determining that the electric rice cooker is in a boiling state, according to the temperature of the bottom temperature sensing bulb and the temperature of the top temperature sensing bulb, whether the bottom temperature of the electric rice cooker rises too fast, where the bottom temperature sensing bulb is configured to collect the bottom temperature, and the top temperature sensing bulb is configured to collect the temperature at the pot cover; control, when determining that the bottom temperature rises too fast, the heating plate to temporally stop heating the bottom of the electric rice cooker; and control, after the temperature of the bottom temperature sensing bulb falls to a first preset temperature, the heating plate to reheat the bottom at a heating power in the boiling stage.

Optionally, the controller is configured to acquire the temperature of the bottom temperature sensing bulb; and judge, according to the temperature of the bottom temperature sensing bulb, whether the electric rice cooker is in the boiling stage.

Optionally, the controller is configured to acquire the temperature of the bottom temperature sensing bulb; respectively compare the temperature of the bottom temperature sensing bulb with a second preset temperature and a third preset temperature; and determine, under a condition in which the temperature of the bottom temperature sensing bulb is higher than the second preset temperature, and is lower than or equal to the third preset temperature, that the electric rice cooker is in the boiling stage, where the third preset temperature is higher than the second preset temperature, and the first preset temperature is higher than the second preset temperature, and is lower than the third preset temperature.

Optionally, the controller is configure to acquire, after it is determined that the electric rice cooker is in the boiling stage according to the temperature of the bottom temperature sensing bulb, the temperature of the bottom temperature sensing bulb and the temperature of the top temperature sensing bulb.

Optionally, the controller is configure to determine, under a condition in which the temperature of the bottom temperature sensing bulb is higher than or equal to a fourth preset temperature, and the temperature of the top temperature sensing bulb is lower than or equal to a fifth preset temperature, that the bottom temperature rises too fast, where the fifth preset temperature is lower than the fourth preset temperature, and the fourth preset temperature is higher than the second preset temperature, and is lower than the third preset temperature.

Optionally, the controller is configure to determine, under a condition in which the temperature of the bottom temperature sensing bulb is lower than the fourth preset temperature, or the temperature of the top temperature sensing bulb is higher than the fifth preset temperature, that the bottom temperature does not rise too fast.

In the above embodiments, under the condition in which it is determined that the electric rice cooker is in the boiling stage, whether the bottom temperature of the electric rice cooker rises fast may be judged according to the temperature of the bottom temperature sensing bulb and the temperature of the top temperature sensing bulb; if it is determined that the bottom temperature rises too fast, the heating plate is controlled to stop heating the bottom; and after the temperature of the bottom temperature sensing bulb falls to the first preset temperature, the heating plate is controlled to reheat the bottom at the heating power in the boiling stage. Therefore, when it is determined that the bottom temperature rises too fast, the bottom is stopped being heated, so that the bottom temperature is prevented from rising continuously to cause the phenomenon that a rice stewing stage is entered early; and after the bottom temperature falls to the first preset temperature, the heating is restarted; and consequently, the rice in the electric rice cooker can be fully boiled and the rice is guaranteed to be cooked thoroughly.

BRIEF DESCRIPTION OF THE DRAWINGS

In order to describe the technical solutions of the embodiments of the present invention more clearly, the drawings required to be used in the embodiments of the present invention will be simply introduced below. Obviously, the drawings described below are only some embodiments of the present invention. Other drawings may further be obtained by those skilled in the art according to these drawings without creative work.

DETAILED DESCRIPTION OF THE EMBODIMENTS

The technical solutions in the embodiments of the invention will be clearly and completely described herein below with reference to the drawings in the embodiments of the invention. It is apparent that the described embodiments are only a part of the embodiments of the invention, not all of the embodiments. On the basis of the embodiments of the invention, all other embodiments obtained on the premise of no creative work of those of ordinary skill in the art shall fall within the scope of protection of the invention.

In a method for controlling a heating temperature of an electric rice cooker provided by an embodiment of the present invention, when determining that the electric rice cooker is in a boiling stage, a temperature of a bottom temperature sensing bulb and a temperature of a top temperature sensing bulb are acquired. It is found by the inventor that if the rice is cooked with hot water, a bottom temperature may rise to be higher than 100° C. in a short time. For example, the temperature of the bottom temperature sensing bulb may rise from 100° C. to 108° C. within 1 min to 2 min. However, the top temperature sensing bulb does not fully contact steam in the cooker in the short time, so that the temperature of the top temperature sensing bulb is below a temperature and may be, for example, below 90° C. Therefore, according to this feature, whether the bottom temperature rises too fast may be judged. If the bottom temperature rises too fast, the bottom is stopped being heated; and after the temperature of the bottom temperature sensing bulb falls to a first preset temperature, the heating on the bottom is restarted and thus the rice is fully boiled and can be cooked thoroughly. The method for controlling the heating temperature of the electric rice cooker will be described below in detail in combination with each embodiment of the present invention.

Figure 1:
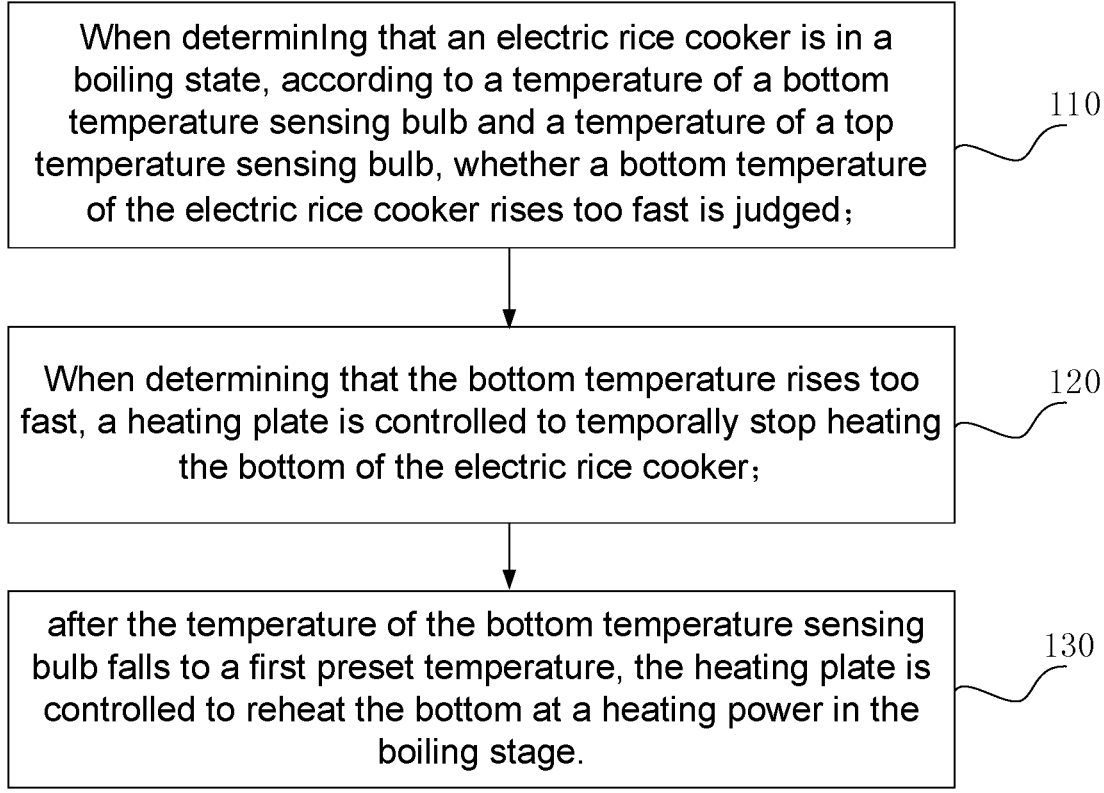
FIG. 1 illustrates an exemplary flowchart of a method for controlling a heating temperature of an electric rice cooker according to some embodiments of the present invention.

FIG. 1 illustrates an exemplary flowchart of a method for controlling a heating temperature of an electric rice cooker according to some embodiments of the present invention. The electric rice cooker may comprise a heating plate, a bottom temperature sensing bulb, a top temperature sensing bulb and a controller; the bottom temperature sensing bulb is configured to collect the bottom temperature of the electric rice cooker (i.e., a liner bottom), the top temperature sensing bulb is configured to collect a top temperature of the electric rice cooker (i.e., a pot cover), and the temperatures collected by the two temperature sensing bulbs may be provided for the controller. The controller may control the heating plate according to the temperatures collected by the temperature sensing bulbs to output a corresponding heating power to heat the bottom. The method may be applied to the controller.

As shown in FIG. 1, at Step S110, when determining that an electric rice cooker is in a boiling state, according to a temperature of a bottom temperature sensing bulb and a temperature of a top temperature sensing bulb, whether a bottom temperature of the electric rice cooker rises too fast is judged.

For example, whether the electric rice cooker is in the boiling state may be determined as follows: the temperature of the bottom temperature sensing bulb is acquired; and according to the temperature of the bottom temperature sensing bulb, whether the electric rice cooker is in the boiling stage is judged. For example, under a condition in which the temperature of the bottom temperature sensing bulb is higher than a second preset temperature, and is lower than or equal to a third preset temperature, it is determined that the electric rice cooker is in the boiling stage.

In one example of the present invention, when temperature of the bottom temperature sensing bulb<60° C., the electric rice cooker is in a rice soaking stage; when 60° C.≤temperature of the bottom temperature sensing bulb≤85° C., the electric rice cooker is in a heating stage; when 85° C.<temperature of the bottom temperature sensing bulb≤120° C., the electric rice cooker is in a boiling stage; and when temperature of the bottom temperature sensing bulb>120° C., the electric rice cooker is in a rice stewing stage. According to the example, if it is detected that the temperature of the bottom temperature sensing bulb is higher than 85° C., and is lower than or equal to 120° C., it may be determined that the electric rice cooker is in the boiling stage at present, i.e., the second preset temperature is 85° C. and the third preset temperature is 120° C. in this example.

In other embodiments of the present invention, the second preset temperature and the third preset temperature may be set as other values according to an actual demand, which is not limited by the present invention.

After it is determined that the electric rice cooker is in the boiling stage, the temperatures of the bottom temperature sensing bulb and the top temperature sensing bulb may be acquired simultaneously, so as to make a preparation to further judge whether the bottom temperature of the electric rice cooker rises too fast.

When the temperature of the bottom temperature sensing bulb reaches to 100° C., steam is generated in the liner; and at this moment, the temperature of the top temperature sensing bulb starts to rise.

For example, if the rice is cooked with room temperature water, the temperature of the bottom temperature sensing bulb rises from 100° C. to 108° C. in 4 min to 6 min; and after 4 min to 6 min of heat transfer of the steam, the temperature of the top temperature sensing bulb rises to 90° C. or more. If the rice is cooked with hot water, the temperature of the bottom temperature sensing bulb rises from 100° C. to 108° C. only in 1 min to 2 min. Since the time that the top temperature sensing bulb contacts the steam is not long, the temperature of the top temperature sensing bulb at this moment is lower than 90° C. As a result, when temperature of the bottom temperature sensing bulb≥108° C., and temperature of the top temperature sensing bulb≤90° C., it may be determined that the bottom temperature of the electric rice cooker rises too fast.

Therefore, in some embodiments, under a condition in which the temperature of the bottom temperature sensing bulb is higher than or equal to the fourth preset temperature, and the temperature of the top temperature sensing bulb is lower than or equal to the fifth preset temperature, it may be determined that the bottom temperature rises too fast. Herein, the fifth preset temperature is lower than the fourth preset temperature, and the fourth preset temperature is higher than the second preset temperature, and is lower than the third preset temperature. According to the above example, the fourth preset temperature may be 108° C., and the fifth preset temperature may be 90° C.

In some embodiments of the present invention, the fourth preset temperature generally may be set as 105° C. to 110° C., such as 106° C. or 109° C., and the fifth preset temperature generally may be set as 90° C. to 95° C. such as 92° C. or 94° C. In other embodiments of the present invention, the fourth preset temperature and the fifth preset temperature may further be set as other values according to an actual demand.

At Step S120, when determining that the bottom temperature rises too fast, a heating plate is controlled to temporally stop heating the bottom of the electric rice cooker.

At Step S130, after the temperature of the bottom temperature sensing bulb falls to a first preset temperature, the heating plate is controlled to reheat the bottom at a heating power in the boiling stage.

In some embodiments of the present invention, the first preset temperature generally may be set as 100° C. to 105° C., such as 102° C. or 104° C. Certainly, the first preset temperature may also be set as other values according to the actual demand, which is not limited by the present invention.

If it is judged that the bottom temperature of the electric rice cooker rises too fast, the heating plate is controlled to temporally stop heating the bottom; and after it is detected that the temperature of the bottom temperature sensing bulb falls to the first preset temperature (such as 103° C.), the heating plate is controlled to reheat the bottom at the heating power in the boiling stage.

If it is judged that the bottom temperature of the electric rice cooker does not rise too fast, whether the electric rice cooker is in the rice stewing stage may be continuously judged according to the temperature of the bottom temperature sensing bulb. For example, if the temperature of the bottom temperature sensing bulb is higher than 120° C., it may be determined that the electric rice cooker is in the rice stewing stage, and at this moment, the heating plate may be controlled to heat the bottom at the heating power in the rice stewing stage. If the temperature of the bottom temperature sensing bulb is higher than 85° C., and is lower than or equal to 120° C., it may be determined that the electric rice cooker is still in the boiling stage, and at this moment, the heating plate may be still controlled to heat the bottom at the heating power in the boiling stage.

In the method for controlling the heating temperature of the electric rice cooker provided by the above embodiment, under the condition in which it is determined that the electric rice cooker is in the boiling stage, whether the bottom temperature of the electric rice cooker rises too fast may be judged according to the temperature of the bottom temperature sensing bulb and the temperature of the top temperature sensing bulb; if it is determined that the bottom temperature rises too fast, the heating plate is controlled to stop heating the bottom; and after the temperature of the bottom temperature sensing bulb falls to the first preset temperature, the heating plate is controlled to reheat the bottom at the heating power in the boiling stage. Therefore, the rice in the electric rice cooker can be fully boiled, the rice is guaranteed to be cooked thoroughly and the phenomenon of half-cooked rice due to the fact that the bottom temperature rises too fast and the rice is not fully boiled to enter the rice stewing stage is prevented.

Figure 2:
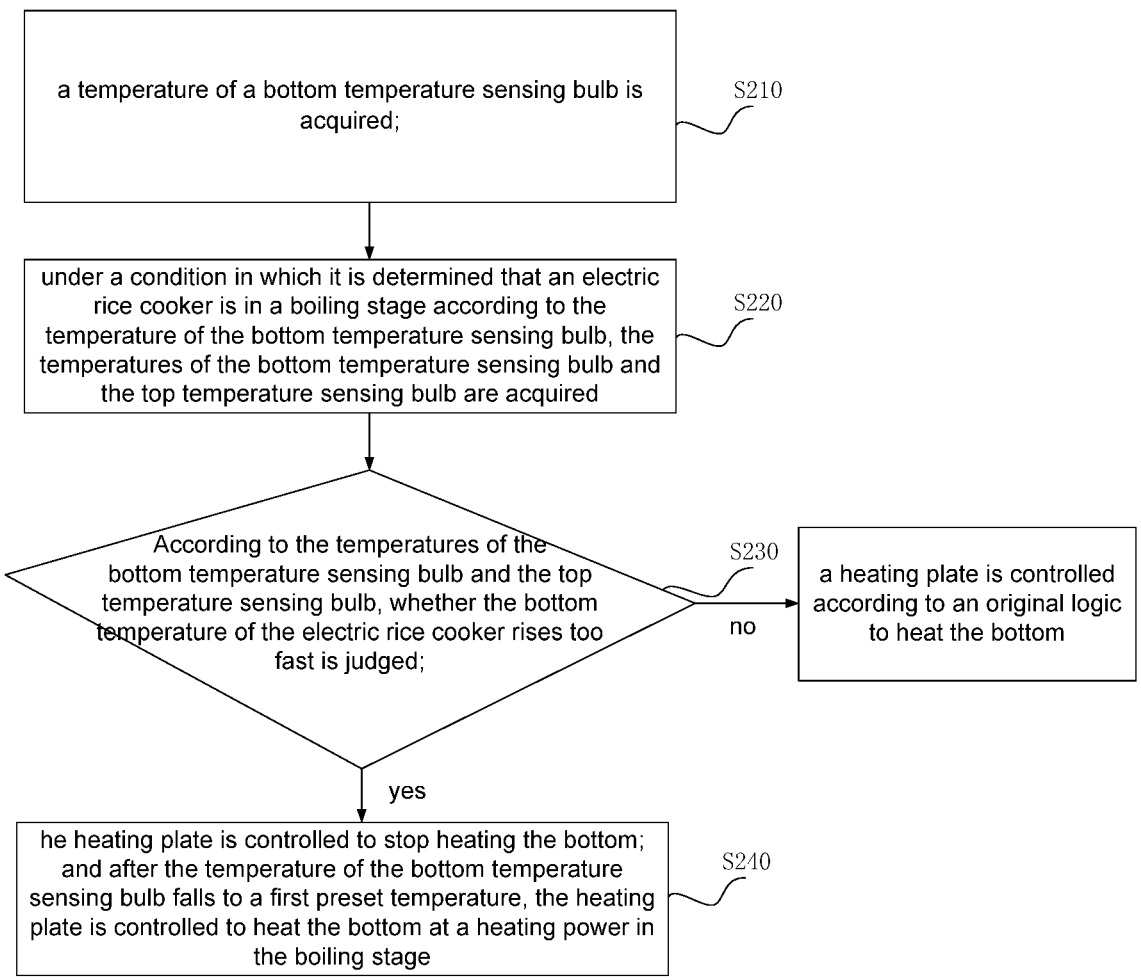
FIG. 2 illustrates an exemplary flowchart of a method for controlling a heating temperature of an electric rice cooker according to another some embodiments of the present invention.

FIG. 2 illustrates an exemplary flowchart of a method for controlling a heating temperature of an electric rice cooker according to another some embodiments of the present invention.

As shown in FIG. 2, at Step S210, a temperature of a bottom temperature sensing bulb is acquired.

At Step S220, when determining that an electric rice cooker is in a boiling stage according to the temperature of the bottom temperature sensing bulb, the temperatures of the bottom temperature sensing bulb and the top temperature sensing bulb are acquired, so as to make a preparation to further judge whether a bottom temperature of the electric rice cooker rises too fast.

At Step S230, according to the temperatures of the bottom temperature sensing bulb and the top temperature sensing bulb, whether the bottom temperature of the electric rice cooker rises too fast is judged; if yes, a step S240 is executed; and if no, a heating plate is controlled according to an original logic to heat the bottom.

At Step S240, the heating plate is controlled to stop heating the bottom; and after the temperature of the bottom temperature sensing bulb falls to a first preset temperature, the heating plate is controlled to heat the bottom at a heating power in the boiling stage.

In the method for controlling the heating temperature of the electric rice cooker provided by the above embodiment, under the condition in which it is determined that the electric rice cooker is in the boiling stage according to the temperature of the bottom temperature sensing bulb, the temperatures of the bottom temperature sensing bulb and the top temperature sensing bulb are acquired, and whether the bottom temperature of the electric rice cooker rises too fast according to the two temperatures; if it is determined that the bottom temperature rises too fast, the heating plate is controlled to stop heating the bottom; and after the temperature of the bottom temperature sensing bulb falls to the first preset temperature, the heating plate is controlled to reheat the bottom at the heating power in the boiling stage. Therefore, the rice in the electric rice cooker can be fully boiled, the rice is guaranteed to be cooked thoroughly and the phenomenon of half-cooked rice due to the fact that the bottom temperature rises too fast and the rice is not fully boiled to enter the rice stewing stage is prevented.

Figure 3:
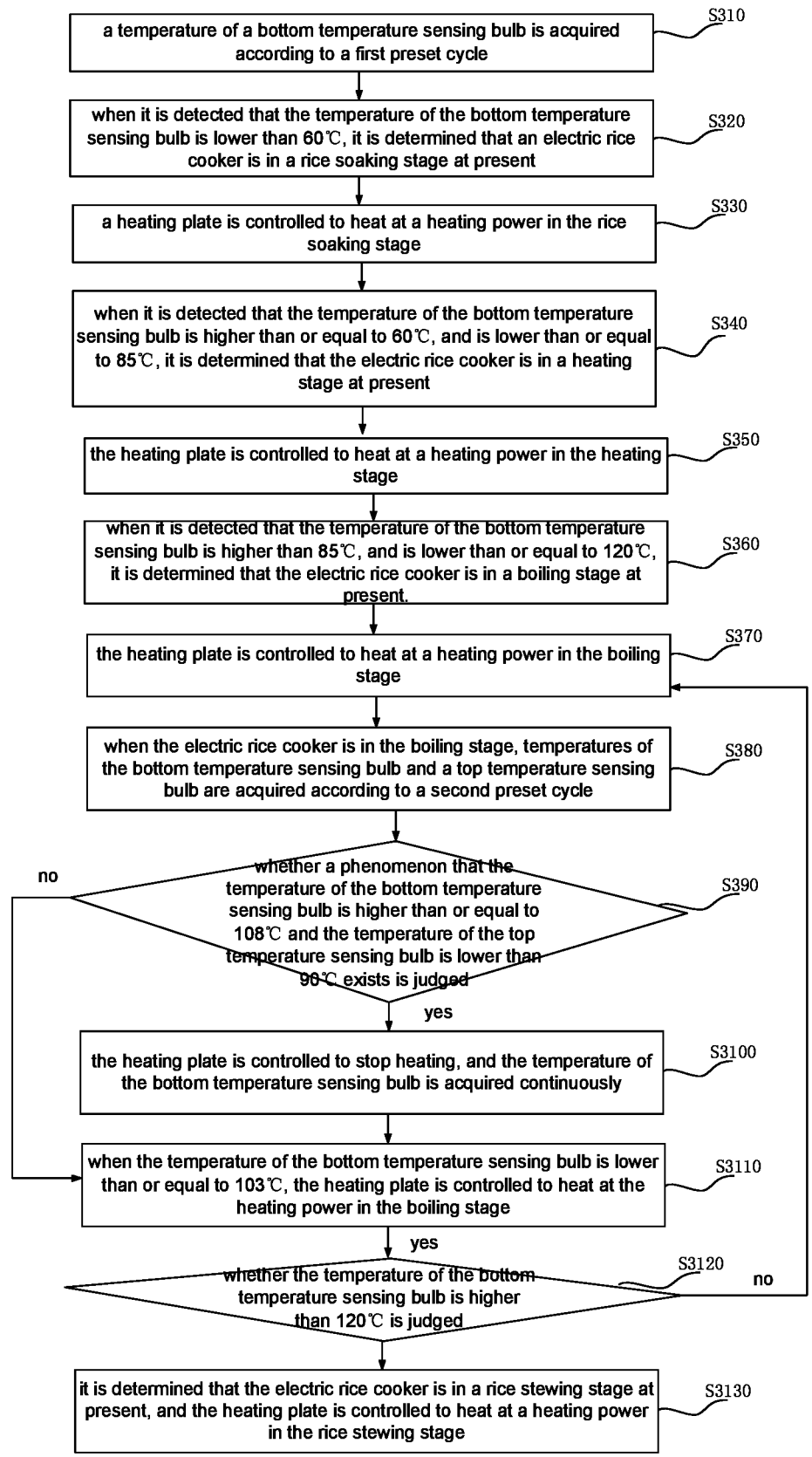
FIG. 3 illustrates an exemplary flowchart of a method for controlling a heating temperature of an electric rice cooker according to still another some embodiments of the present invention.

FIG. 3 illustrates an exemplary flowchart of a method for controlling a heating temperature of an electric rice cooker according to still another some embodiments of the present invention. The method exemplarily introduces the whole rice cooking process of the electric rice cooker.

As shown in FIG. 3, at Step S310, a temperature of a bottom temperature sensing bulb is acquired according to a first preset cycle. For example, the first preset cycle may be 10 s or 5 s.

At Step S320, when it is detected that the temperature of the bottom temperature sensing bulb is lower than 60° C., it is determined that an electric rice cooker is in a rice soaking stage at present.

At Step S330, a heating plate is controlled to heat at a heating power in the rice soaking stage.

At Step S340, when it is detected that the temperature of the bottom temperature sensing bulb is higher than or equal to 60° C., and is lower than or equal to 85° C., it is determined that the electric rice cooker is in a heating stage at present.

At Step S350, the heating plate is controlled to heat at a heating power in the heating stage.

At Step S360, when it is detected that the temperature of the bottom temperature sensing bulb is higher than 85° C., and is lower than or equal to 120° C., it is determined that the electric rice cooker is in a boiling stage at present.

At Step S370, the heating plate is controlled to heat at a heating power in the boiling stage.

At Step S380, when the electric rice cooker is in the boiling stage, temperatures of the bottom temperature sensing bulb and a top temperature sensing bulb are acquired according to a second preset cycle. For example, the second preset cycle may be 10 s. Certainly, the second preset cycle may also be other preset cycles. The second preset cycle may be same with the first preset cycle, and may also be different.

At Step S390, whether a phenomenon that the temperature of the bottom temperature sensing bulb is higher than or equal to 108° C. and the temperature of the top temperature sensing bulb is lower than 90° C. exists is judged. If yes, a step S3100 is executed; and if no, a step S3120 is executed.

At Step S3100, the heating plate is controlled to stop heating, and the temperature of the bottom temperature sensing bulb is acquired continuously.

At Step S3110, when the temperature of the bottom temperature sensing bulb is lower than or equal to 103° C., the heating plate is controlled to heat at the heating power in the boiling stage.

At Step S3120, whether the temperature of the bottom temperature sensing bulb is higher than 120° C. is judged; if yes, a step S3130 is executed; and if no, it is determined that the electric rice cooker is in the boiling stage at present, and the step is returned to execute the step S370.

At Step S3130, it is determined that the electric rice cooker is in a rice stewing stage at present, and the heating plate is controlled to heat at a heating power in the rice stewing stage.

In the method for controlling the heating temperature of the electric rice cooker provided by the above embodiment, under the condition in which it is determined that the electric rice cooker is in the boiling stage according to the temperature of the bottom temperature sensing bulb, the temperatures of the bottom temperature sensing bulb and the top temperature sensing bulb are acquired, and whether the bottom temperature of the electric rice cooker rises too fast according to the two temperatures; if it is determined that the bottom temperature rises too fast, the heating plate is controlled to stop heating the bottom; and after the temperature of the bottom temperature sensing bulb falls to the first preset temperature, the heating plate is controlled to reheat the bottom at the heating power in the boiling stage. Therefore, the rice in the electric rice cooker can be fully boiled, the rice is guaranteed to be cooked thoroughly and the phenomenon of half-cooked rice due to the fact that the bottom temperature rises too fast and the rice is not fully boiled to enter the rice stewing stage is prevented.

For the simplicity of description, each of the foregoing method embodiments is expressed as a combination of a series of actions. However, those skilled in the art should understand that the present invention is not limited by a sequence of the described actions. According to the present invention, some step may adopt other sequence or is performed simultaneously. Then, those skilled in the art should also understand that the embodiments described in the specifications are preferred embodiments, and any related action and module may be unnecessary for the present invention.

Corresponding to the above method embodiment, the present invention further provides an embodiment of a device for controlling a heating temperature of an electric rice cooker.

Figure 4:
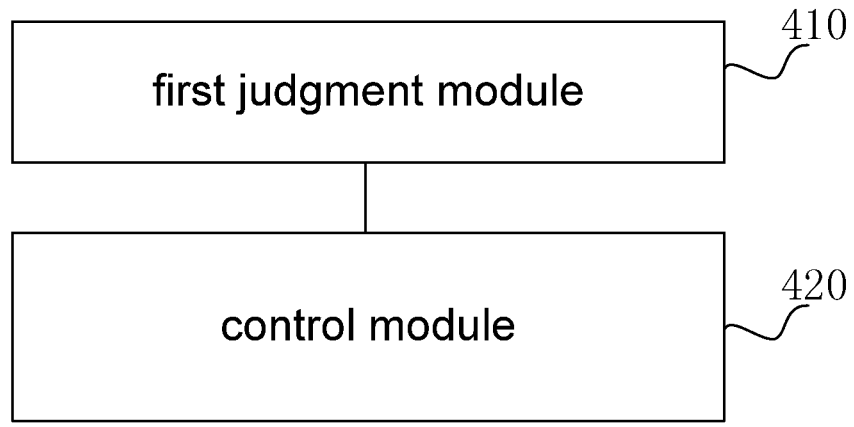
FIG. 4 illustrates an exemplary block diagram of a device for controlling a heating temperature of an electric rice cooker according to some embodiments of the present invention.

FIG. 4 illustrates an exemplary block diagram of a device for controlling a heating temperature of an electric rice cooker according to some embodiments of the present invention. The control device may be applied to the electric rice cooker. The electric rice cooker may comprise a heating plate, a bottom temperature sensing bulb, a top temperature sensing bulb and the control device; the bottom temperature sensing bulb is configured to collect a bottom temperature of the electric rice cooker, the top temperature sensing bulb is configured to collect a top temperature of the electric rice cooker (i.e., a pot cover), and the temperatures collected by the two temperature sensing bulbs may be provided for the control device. The control device may control a heating plate according to the temperatures collected by the temperature sensing bulbs to output a corresponding heating power to heat the bottom.

As shown in FIG. 4, the control device may comprise a first judgment module 410 and a control module 420.

The first judgment module 410 is configured to judge, when determining that an electric rice cooker is in a boiling state, according to a temperature of a bottom temperature sensing bulb and a temperature of a top temperature sensing bulb, whether a bottom temperature of the electric rice cooker rises too fast.

The control module 420 is configured to control, when determining that the bottom temperature rises too fast, a heating plate to temporally stop heating the bottom of the electric rice cooker, and control, after the temperature of the bottom temperature sensing bulb falls to a first preset temperature, the heating plate to reheat the bottom at a heating power in the boiling stage. For example, the first preset temperature generally may be set as 100° C. to 105° C. such as 102° C. or 103° C.

In the device for controlling the heating temperature of the electric rice cooker provided by the above embodiment, under the condition in which it is determined that the electric rice cooker is in the boiling stage, whether the bottom temperature of the electric rice cooker rises too fast is judged according to the temperature of the bottom temperature sensing bulb and the temperature of the top temperature sensing bulb; if it is determined that the bottom temperature rises too fast, the heating plate is controlled to stop heating the bottom; and after the temperature of the bottom temperature sensing bulb falls to the first preset temperature, the heating plate is controlled to reheat the bottom at the heating power in the boiling stage. Therefore, the rice in the electric rice cooker can be fully boiled, the rice is guaranteed to be cooked thoroughly and the phenomenon of half-cooked rice due to the fact that the bottom temperature rises too fast and the rice is not fully boiled to enter the rice stewing stage is prevented.

Figure 5:
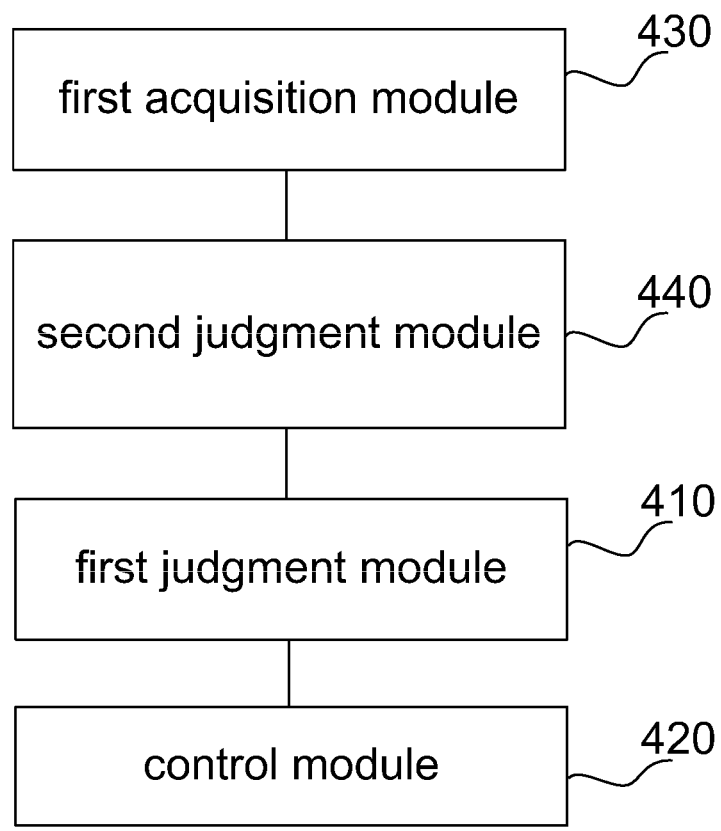
FIG. 5 illustrates an exemplary block diagram of a device for controlling a heating temperature of an electric rice cooker according to another some embodiments of the present invention.

FIG. 5 illustrates an exemplary block diagram of a device for controlling a heating temperature of an electric rice cooker according to another some embodiments of the present invention.

As shown in FIG. 5, compared with the control device shown in FIG. 4, the control device may further comprise a first acquisition module 430 and a second judgment module 440.

The first acquisition module 430 is configured to acquire a temperature of a bottom temperature sensing bulb.

The second judgment module 440 is configured to respectively compare the temperature of the bottom temperature sensing bulb with a second preset temperature and a third preset temperature, and determine, under a condition in which the temperature of the bottom temperature sensing bulb is higher than the second preset temperature, and is lower than or equal to the third preset temperature, that the electric rice cooker is in the boiling stage. Herein, the third preset temperature is higher than the second preset temperature, and the first preset temperature is higher than the second preset temperature, and is lower than the third preset temperature.

In some embodiments of the present invention, the second preset temperature may be set as 85° C. and the third preset temperature may be set as 120° C.

Figure 6:
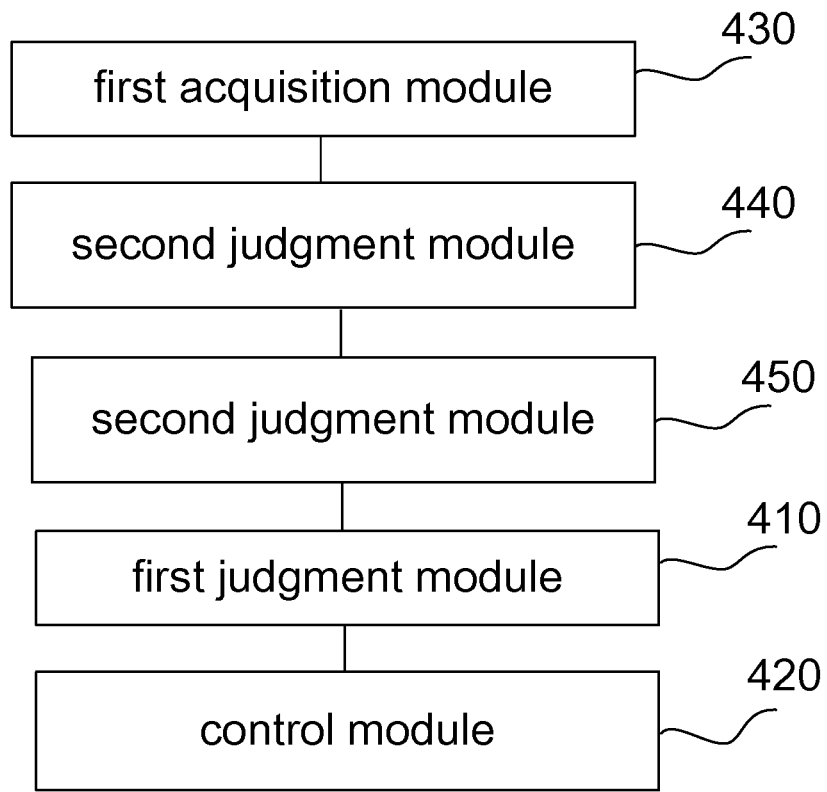
FIG. 6 illustrates an exemplary block diagram of a device for controlling a heating temperature of an electric rice cooker according to still another some embodiments of the present invention.

FIG. 6 illustrates an exemplary block diagram of a device for controlling a heating temperature of an electric rice cooker according to still another some embodiments of the present invention.

As shown in FIG. 6, compared with the control device shown in FIG. 5, the control device may further comprise a second acquisition module 450.

The second acquisition module 450 is configured to acquire, after it is determined that the electric rice cooker is in the boiling stage, the temperature of the bottom temperature sensing bulb and the temperature of the top temperature sensing bulb. For example, after it is determined that the electric rice cooker is in the boiling stage, the temperature of the bottom temperature sensing bulb and the temperature of the top temperature sensing bulb are acquired at a preset cycle (e.g., every 10 s).

Correspondingly, the first judgment module 410 is configured to judge whether the bottom temperature rises too fast according to the temperature of the bottom temperature sensing bulb and the temperature of the top temperature sensing bulb.

Figure 7:
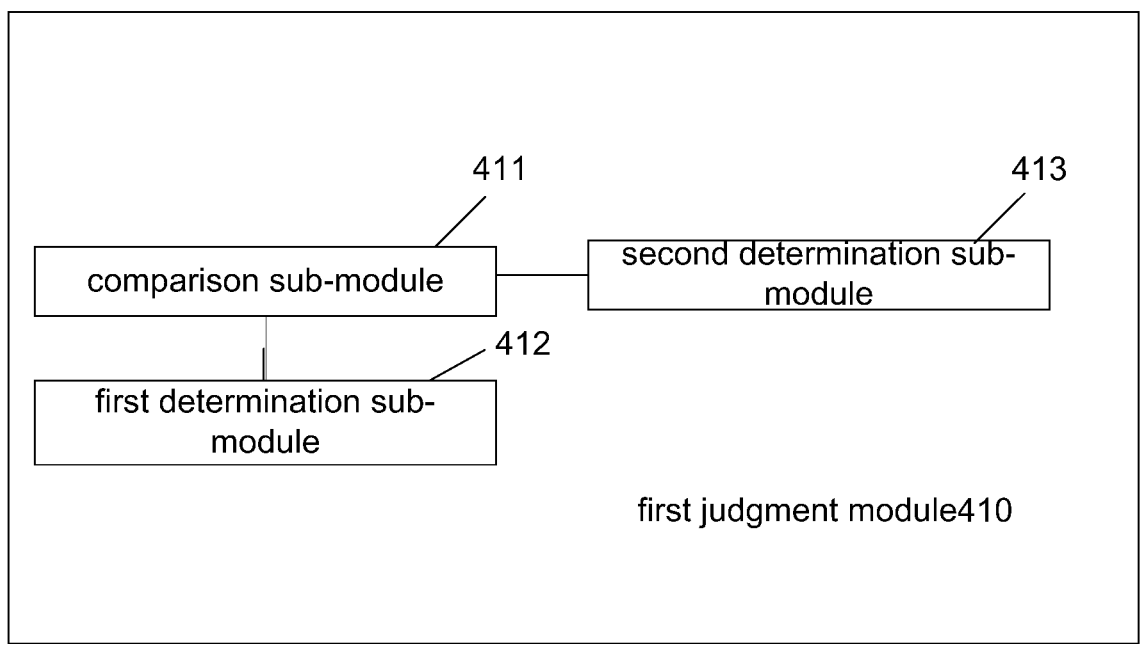
FIG. 7 illustrates an exemplary block diagram of a first judgment module according to some embodiments of the present invention.

FIG. 7 illustrates an exemplary block diagram of a first judgment module 410 according to some embodiments of the present invention.

As shown in FIG. 7, the first judgment module 410 may comprise a comparison sub-module 411, a first determination sub-module 412 and a second determination sub-module 413.

The comparison sub-module 411 is configured to compare the bottom of the bottom temperature sensing bulb with a fourth preset temperature and compare the temperature of the top temperature sensing bulb with a fifth preset temperature, where the fifth preset temperature is lower than the fourth preset temperature, and the fourth preset temperature is higher than the second preset temperature, and is lower than the third preset temperature.

The first determination sub-module 412 is configured to determine, under a condition in which the temperature of the bottom temperature sensing bulb is higher than or equal to the fourth preset temperature, and the temperature of the top temperature sensing bulb is lower than or equal to the fifth preset temperature, that the bottom temperature rises too fast.

The second determination sub-module 413 is configured to determine, under a condition in which the temperature of the bottom temperature sensing bulb is lower than the fourth preset temperature, or the temperature of the top temperature sensing bulb is higher than the fifth preset temperature, that the bottom temperature does not rise too fast.

For example, the fourth preset temperature may be 108° C., and the fifth preset temperature may be 90° C. When temperature of the bottom temperature sensing bulb≥108° C., and temperature of the top temperature sensing bulb≤90° C. , it is determined that the bottom temperature of the electric rice cooker rises too fast. When temperature of the bottom temperature sensing bulb<108° C. or temperature of the top temperature sensing bulb>90° C., it is determined that the bottom temperature of the electric rice cooker does not rise too fast.

It is to be noted that in some embodiments of the present invention, the first judgment module 410 may also only comprise the comparison sub-module 411 and the first determination sub-module 412.

Figure 8:
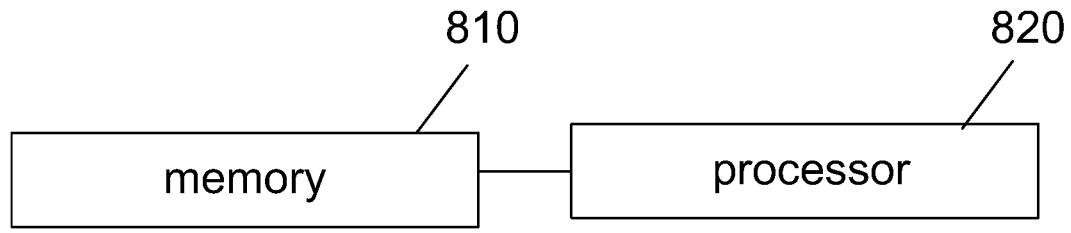
FIG. 8 illustrates an exemplary block diagram of a device for controlling a heating temperature of an electric rice cooker according to still another some embodiments of the present invention.

FIG. 8 illustrates an exemplary block diagram of a device for controlling a heating temperature of an electric rice cooker according to still another some embodiments of the present invention.

As show in FIG. 8, the control device may comprise a memory 810 and a processor 820. The memory 810 may be a magnetic disk, a flash memory or other any nonvolatile storage medium. The memory 810 is configured to store an instruction corresponding to the method in the above any embodiment. The processor 820 is coupled to the memory 810, and may be implemented as one or more integrated circuits, such as a microprocessor or a microcontroller. The processor 820 is configured to execute the instruction stored in the memory 810, so that the rice in the electric rice cooker can be fully boiled, the rice is guaranteed to be cooked thoroughly and the phenomenon of half-cooked rice due to the fact that the bottom temperature rises too fast and the rice is not fully boiled to enter the rice stewing stage is prevented.

Figure 9:
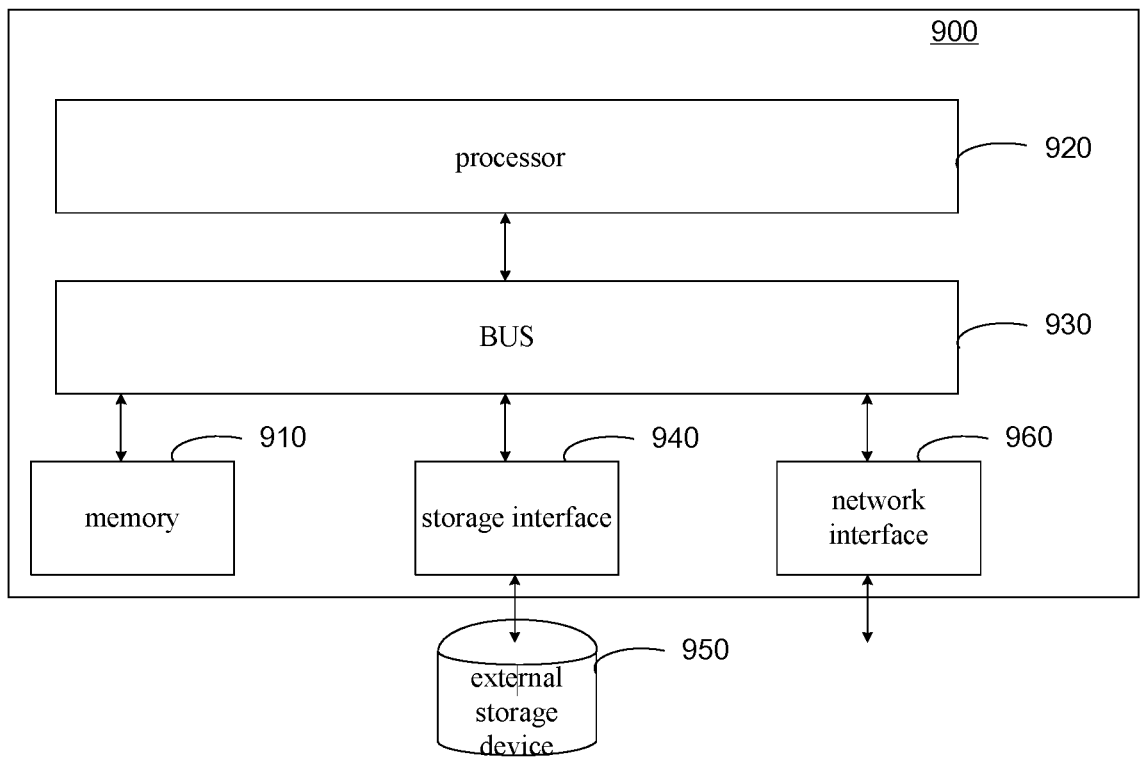
FIG. 9 illustrates an exemplary block diagram of a device for controlling a heating temperature of an electric rice cooker according to further another some embodiments of the present invention.

FIG. 9 illustrates an exemplary block diagram of a device for controlling a heating temperature of an electric rice cooker according to further another some embodiments of the present invention.

As shown in FIG. 9, the control device 900 may comprise a memory 910 and a processor 920. The processor 920 is coupled to the memory 910 via a bus 930. The control device 900 may further be connected to an external storage device 950 via a storage interface 940 to invoke external data, and may further be connected to a network or an external computer system (not shown) via a network interface 960.

In the above embodiment, the memory stores a data instruction and then the instruction is processed by the processor, so that the rice in the electric rice cooker can be fully boiled, the rice is guaranteed to be cooked thoroughly and the phenomenon of half-cooked rice due to the fact that the bottom temperature rises too fast and the rice is not fully boiled to enter the rice stewing stage is prevented.

An embodiment of the present invention further provides an electric rice cooker; and the electric rice cooker may comprise the device for controlling the heating temperature of the electric rice cooker provided by the above any embodiment.

Figure 10:
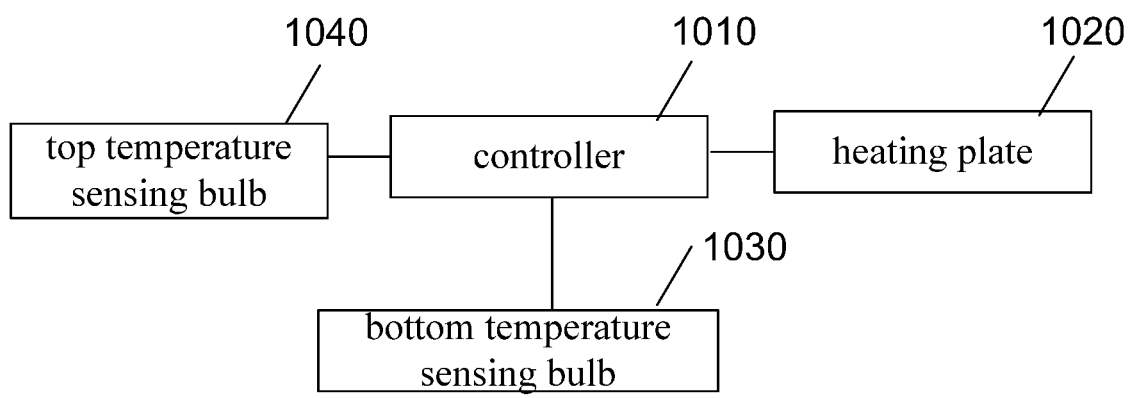
FIG. 10 illustrates an exemplary block diagram of an electric rice cooker according to some embodiments of the present invention.

FIG. 10 illustrates an exemplary block diagram of an electric rice cooker according to some embodiments of the present invention.

As shown in FIG. 10, the electric rice cooker may comprise a controller 1010, a heating plate 1020, a bottom temperature sensing bulb 1030 and a top temperature sensing bulb 1040. In addition, the electric rice cooker may further comprise a liner and a pot cover.

The heating plate 1020 is disposed in an electric rice cooker main body, and is configured to heat the liner.

The bottom temperature sensing bulb 1030 is disposed at a bottom of the electric rice cooker main body, and is configured to collect a bottom temperature of the liner.

The top temperature sensing bulb 1040 is disposed on the pot cover, and is configured to collect a temperature at the pot cover.

A first input end of the controller 1010 is electrically connected with the bottom temperature sensing bulb 1030; a second input end of the controller 1010 is electrically connected with the top temperature sensing bulb 1040; an output end of the controller 1010 is electrically connected with the heating plate 1020; and the controller 1010 is configured to judge, when determining that the electric rice cooker is in a boiling state, according to the temperature of the bottom temperature sensing bulb 1030 and the temperature of the top temperature sensing bulb 1040, whether the bottom temperature of the electric rice cooker rises too fast; control, when determining that the bottom temperature rises too fast, the heating plate to temporally stop heating the bottom of the electric rice cooker; and control, after the temperature of the bottom temperature sensing bulb 1030 falls to a first preset temperature, the heating plate to reheat the bottom at a heating power in the boiling stage. In some embodiments of the present invention, the controller 1010 is configured to acquire, under the condition in which it is determined that the electric rice cooker is in the boiling stage, the temperature of the bottom temperature sensing bulb 1030 and the temperature of the top temperature sensing bulb 1040 at a preset cycle.

In the electric rice cooker provided by the above embodiment, under the condition in which it is determined that the electric rice cooker is in the boiling stage, whether the bottom temperature of the electric rice cooker rises too fast is judged according to the temperature of the bottom temperature sensing bulb and the temperature of the top temperature sensing bulb; if it is determined that the bottom temperature rises too fast, the heating plate is controlled to stop heating the bottom; and after the temperature of the bottom temperature sensing bulb falls to the first preset temperature, the heating plate is controlled to reheat the bottom at the heating power in the boiling stage. Therefore, the rice in the electric rice cooker can be fully boiled, the rice is guaranteed to be cooked thoroughly and the phenomenon of half-cooked rice due to the fact that the bottom temperature rises too fast and the rice is not fully boiled to enter the rice stewing stage is prevented.

In some embodiments of the present invention, the controller 1010 is configured to acquire the temperature of the bottom temperature sensing bulb 1030; respectively compare the temperature of the bottom temperature sensing bulb 1030 with a second preset temperature and a third preset temperature; and determine, under a condition in which the temperature of the bottom temperature sensing bulb 1030 is higher than the second preset temperature, and is lower than or equal to the third preset temperature, that the electric rice cooker is in the boiling stage, where the third preset temperature is higher than the second preset temperature, and the first preset temperature is higher than the second preset temperature, and is lower than the third preset temperature. For example, when 85° C.<temperature of the bottom temperature sensing bulb≤120° C., it is determined that the electric rice cooker is in the boiling stage. In this example, the second preset temperature is 85° C. and the third preset temperature is 120° C.

In some embodiments of the present invention, the controller 1010 is configured to determine, under a condition in which the temperature of the bottom temperature sensing bulb 1030 is higher than or equal to a fourth preset temperature, and the temperature of the top temperature sensing bulb 1040 is lower than or equal to a fifth preset temperature, that the bottom temperature rises too fast; and determine, under a condition in which the temperature of the bottom temperature sensing bulb 1030 is lower than the fourth preset temperature, or the temperature of the top temperature sensing bulb 1040 is higher than the fifth preset temperature, that the bottom temperature does not rise too fast. Herein, the fifth preset temperature is lower than the fourth preset temperature, and the fourth preset temperature is higher than the second preset temperature, and is lower than the third preset temperature. For example, the fourth preset temperature may be set as 105° C. to 110° C., and the fifth preset temperature generally may be set as 90° C. to 95° C. In other embodiments of the present invention, the fourth preset temperature and the fifth preset temperature may further be set as other values according to an actual demand.

The present invention further provides a computer readable storage medium, which stores a computer program instruction; and the instruction implements the method in the above any embodiment when being executed by a processor.

Each embodiment in the specification is described in a progressive manner, the emphasis of each embodiment is put on explaining the difference from other embodiments and the same or similar parts of each embodiment may refer to each other. The embodiment of the control device is basically corresponding to the embodiment of the control method, so the description is relatively simple, and related parts may be referred to the method embodiment.

At the end, it is to be explained that the relationship terms, such as "first" and "second", are used herein only for distinguishing one entity or operation from another entity or operation but do not necessarily require or imply that there exists any actual relationship or sequence of this sort between these entities or operations. Furthermore, terms "comprising", "including" or any other variants are intended to cover the non-exclusive including, thereby making that the process, method, merchandise or device comprising a series of elements comprise not only those elements but also other elements that are not listed explicitly or the inherent elements to the process, method, merchandise or device. In the case of no more limitations, the element limited by the sentence "comprising a . . . " does not exclude that there exists another same element in the process, method, merchandise or device comprising the element.

For the convenience of description, when the above device is described, a function is separated into various units to describe respectively. Certainly, when the present invention is implemented, a function of each unit may be implemented in a same or multiple software and/or hardware.

Based on the foregoing descriptions of the embodiments, the person skilled in the art may clearly understand that the present invention may be implemented by software in addition to a necessary universal platform. Based on such an understanding, the technical solutions of the present invention essentially or the part contributing to the prior art may be implemented in a form of a software product. The software product is stored in a readable storage medium, such as a Read-Only Memory (ROM)/Random Access Memory (RAM), a magnetic disk and an optical disc, and comprises several instructions for instructing a computer device (which may be a personal computer, a server, a network device, and the like) to perform the methods described in the embodiments or some parts of the embodiments.

The above descriptions of the disclosed embodiments enable professional and technical personnel in the art to achieve or use the present invention. Obviously, the professional and technical personnel in the art will make many modifications to these embodiments, the general principles defined in the present invention may be achieved in the other embodiments without departing from the spirit or essential attributes of the present invention. Therefore, the present invention will not be limited to the embodiments shown herein, but to conform to the maximum extent of principles and new features that are disclosed herein.

At last, it should be noted that the above embodiments are merely for explaining the technical solutions of the present invention but not to limit the technical solutions. Although the present invention has been described in detail with reference to the preferred embodiments, the person of ordinary skill in the art should understand that a modification may still be made to the specific implementation manners of the present invention or an equivalent replacement may still be made to a part of technical features therein without departing from the spirit of the technical solutions of the present invention. All should be comprised in a scope of the technical solutions claimed in the present invention.

What is claimed is:

1. A method for controlling a heating temperature of an electric rice cooker, comprising:
   when determining that the electric rice cooker is in a boiling state, according to a temperature of a bottom temperature sensing bulb and a temperature of a top temperature sensing bulb, judging whether a bottom temperature of the electric rice cooker rises too fast, wherein the bottom temperature sensing bulb is configured to collect the bottom temperature, and the top temperature sensing bulb is configured to collect a temperature at a pot cover;
   when determining that the bottom temperature rises too fast, controlling a heating plate to temporally stop heating a bottom of the electric rice cooker; and
   after the temperature of the bottom temperature sensing bulb falls to a first preset temperature, controlling the heating plate to reheat the bottom at a heating power in the boiling stage,
   wherein the determining that the electric rice cooker is in a boiling stage comprises:
   acquiring the temperature of the bottom temperature sensing bulb;
   respectively comparing the temperature of the bottom temperature sensing bulb with a second preset temperature and a third preset temperature; and
   under a condition in which the temperature of the bottom temperature sensing bulb is higher than the second preset temperature, and is lower than or equal to the third preset temperature, determining that the electric rice cooker is in the boiling stage,
   wherein the third preset temperature is higher than the second preset temperature, and the first preset temperature is higher than the second preset temperature, and is lower than the third preset temperature.

2. The method as claimed in claim 1, wherein
   under a condition in which the temperature of the bottom temperature sensing bulb is higher than or equal to a fourth preset temperature, and the temperature of the top temperature sensing bulb is lower than or equal to a fifth preset temperature, it is determined that the bottom temperature rises too fast,
   wherein the fifth preset temperature is lower than the fourth preset temperature, and the fourth preset temperature is higher than the second preset temperature, and is lower than the third preset temperature.

3. The method as claimed in claim 2, wherein
   under a condition in which the temperature of the bottom temperature sensing bulb is lower than the fourth preset temperature, or the temperature of the top temperature sensing bulb is higher than the fifth preset temperature, it is determined that the bottom temperature does not to rise too fast.

4. The method as claimed in claim 1, wherein the temperature of the bottom temperature sensing bulb and the temperature of the top temperature sensing bulb are acquired at a preset cycle.

5. A device for controlling a heating temperature of an electric rice cooker, comprising:
   a first judgment module, configured to judge, when determining that the electric rice cooker is in a boiling state, according to a temperature of a bottom temperature sensing bulb and a temperature of a top temperature sensing bulb, whether a bottom temperature of the electric rice cooker rises too fast, wherein the bottom temperature sensing bulb is configured to collect the bottom temperature, and the top temperature sensing bulb is configured to collect a temperature at a pot cover; and
   a control module, configured to control, when determining that the bottom temperature rises too fast, a heating plate to temporally stop heating the bottom of the electric rice cooker, and control, after the temperature of the bottom temperature sensing bulb falls to a first preset temperature, the heating plate to reheat the bottom at a heating power in the boiling stage;

further comprising:

a first acquisition module, configured to acquire the temperature of the bottom temperature sensing bulb; and a second judgment module, configured to respectively compare the temperature of the bottom temperature sensing bulb with a second preset temperature and a third preset temperature; and determine, under a condition in which the temperature of the bottom temperature sensing bulb is higher than the second preset temperature, and is lower than or equal to the third preset temperature, that the electric rice cooker is in the boiling stage, wherein the third preset temperature is higher than the second preset temperature, and a first preset temperature is higher than the second preset temperature, and is lower than the third preset temperature.

6. The device as claimed in claim 5, further comprising:

a second acquisition module, configured to acquire, after it is determined that the electric rice cooker is in the boiling stage, the temperature of the bottom temperature sensing bulb and the temperature of the top temperature sensing bulb; and the first judgment module comprises:

a comparison sub-module, configured to compare the bottom of the bottom temperature sensing bulb with a fourth preset temperature and compare the temperature of the top temperature sensing bulb with a fifth preset temperature, wherein the fifth preset temperature is lower than the fourth preset temperature, and the fourth preset temperature is higher than the second preset temperature, and is lower than the third preset temperature; and a first determination sub-module, configured to determine, under a condition in which the temperature of the bottom temperature sensing bulb is higher than or equal to the fourth preset temperature, and the temperature of the top temperature sensing bulb is lower than or equal to the fifth preset temperature, that the bottom temperature rises too fast.

7. The device as claimed in claim 6, wherein the first judgment module further comprises:

a second determination sub-module, configured to determine, under a condition in which the temperature of the bottom temperature sensing bulb is lower than the fourth preset temperature, or the temperature of the top temperature sensing bulb is higher than the fifth preset temperature, that the bottom temperature does not rise too fast.

8. A device for controlling a heating temperature of an electric rice cooker, comprising:

a memory; and a processor coupled to the memory, wherein the processor is configured to execute the method as claimed in claim 1 based on an instruction in the memory.

9. A computer readable storage medium, storing a computer program instruction, and the instruction implementing the method as claimed in claim 1 when being executed by a processor.

10. An electric rice cooker, comprising: a heating plate, a bottom temperature sensing bulb, a top temperature sensing bulb and a controller, wherein the heating plate is disposed in an electric rice cooker main body, and is configured to heat a liner of the electric rice cooker;

the bottom temperature sensing bulb is disposed at a bottom of the electric rice cooker main body, and is configured to collect a bottom temperature of the liner;

the top temperature sensing bulb is disposed on a pot cover of the electric rice cooker, and is configured to collect a temperature at the pot cover;

a first input end of the controller is electrically connected with the bottom temperature sensing bulb; a second input end of the controller is electrically connected with the top temperature sensing bulb; and an output end of the controller is electrically connected with the heating plate; and the controller is configured to judge, when determining that the electric rice cooker is in a boiling state, according to the temperature of the bottom temperature sensing bulb and the temperature of the top temperature sensing bulb, whether the bottom temperature of the electric rice cooker rises too fast, wherein the bottom temperature sensing bulb is configured to collect the bottom temperature, and the top temperature sensing bulb is configured to collect the temperature at the pot cover; control, when determining that the bottom temperature rises too fast, the heating plate to temporally stop heating the bottom of the electric rice cooker; and control, after the temperature of the bottom temperature sensing bulb falls to a first preset temperature, the heating plate to reheat the bottom at a heating power in the boiling stage, wherein the controller is configured to acquire the temperature of the bottom temperature sensing bulb; respectively compare the temperature of the bottom temperature sensing bulb with a second preset temperature and a third preset temperature; and determine, under a condition in which the temperature of the bottom temperature sensing bulb is higher than the second preset temperature, and is lower than or equal to the third preset temperature, that the electric rice cooker is in the boiling stage, wherein the third preset temperature is higher than the second preset temperature, and the first preset temperature is higher than the second preset temperature, and is lower than the third preset temperature.

11. The electric rice cooker as claimed in claim 10, wherein the controller is configure to determine, under a condition in which the temperature of the bottom temperature sensing bulb is higher than or equal to a fourth preset temperature, and the temperature of the top temperature sensing bulb is lower than or equal to a fifth preset temperature, that the bottom temperature rises too fast, wherein the fifth preset temperature is lower than the fourth preset temperature, and the fourth preset temperature is higher than the second preset temperature, and is lower than the third preset temperature.

12. The electric rice cooker as claimed in claim 11, wherein the controller is configure to determine, under a condition in which the temperature of the bottom temperature sensing bulb is lower than the fourth preset temperature, or the temperature of the top temperature sensing bulb is higher than the fifth preset temperature, that the bottom temperature does not rise too fast.

13. A device for controlling a heating temperature of an electric rice cooker, comprising:
a memory; and
a processor coupled to the memory, wherein the processor is configured to execute the method as claimed in claim 2 based on an instruction in the memory.

14. A device for controlling a heating temperature of an electric rice cooker, comprising:
a memory; and
a processor coupled to the memory, wherein the processor is configured to execute the method as claimed in claim 3 based on an instruction in the memory.

15. A device for controlling a heating temperature of an electric rice cooker, comprising:
a memory; and
a processor coupled to the memory, wherein the processor is configured to execute the method as claimed in claim 4 based on an instruction in the memory.

* * * * *